United States Patent
Olsen et al.

(10) Patent No.: US 9,860,653 B2
(45) Date of Patent: Jan. 2, 2018

(54) HEARING AID DEVICE WITH POSITIONING GUIDE AND HEARING AID DEVICE SYSTEM

(71) Applicant: Oticon A/S, Smørum (DK)

(72) Inventors: Thor Højlund Olsen, Smørum (DK); Povl Koch, Smørum (DK); Troels Holm Pedersen, Smørum (DK); Claus Nielsen, Smørum (DK); Søren Laugesen, Smørum (DK); Karsten Bo Rasmussen, Smørum (DK); Peter Sommer, Smørum (DK); Kåre Tais Christensen, Smørum (DK); Svend Oscar Petersen, Smørum (DK); Jørn Johansen, Smørum (DK); Bent Severin, Smørum (DK); Jan Frantzen, Smørum (DK); Lars Lund Jørgensen, Smørum (DK); Glenn Jensen, Smørum (DK); Anders Højsgaard Thomsen, Smørum (DK); Steen Michael Munk, Smørum (DK); Henrik Lodberg Olsen, Smørum (DK); Anders Hebsgaard, Smørum (DK); Vijay Kumar Bhat, Smørum (DK)

(73) Assignee: OTICON A/S, Smørum (DK)

( * ) Notice: Subject to any disclaimer, the term of this patent is extended or adjusted under 35 U.S.C. 154(b) by 0 days.

(21) Appl. No.: 15/132,684

(22) Filed: Apr. 19, 2016

(65) Prior Publication Data
US 2016/0309266 A1    Oct. 20, 2016

(30) Foreign Application Priority Data

Apr. 20, 2015  (EP) .................................... 15164226

(51) Int. Cl.
| | | |
|---|---|---|
| H04R 25/00 | (2006.01) | |
| G01S 15/08 | (2006.01) | |
| G01S 15/88 | (2006.01) | |

(52) U.S. Cl.
CPC ............ H04R 25/305 (2013.01); G01S 15/08 (2013.01); G01S 15/88 (2013.01); H04R 25/604 (2013.01);
(Continued)

(58) Field of Classification Search
CPC .... H04R 25/45; H04R 25/65; H04R 2225/67; H04R 2225/63
See application file for complete search history.

(56) References Cited

U.S. PATENT DOCUMENTS 3,346,704 A * 10/1967 Mahoney ............. H04R 25/606
                                                        600/25
4,498,332 A *  2/1985 Bruckhoff ............... G01M 3/26
                                                        381/60
(Continued)

FOREIGN PATENT DOCUMENTS

CH   WO 2010049543 A2 *  5/2010  ........... H04R 25/305
DE       296 08 352 U1     11/1996
(Continued)

*Primary Examiner* — Mohammad Islam
(74) *Attorney, Agent, or Firm* — Birch, Stewart, Kolasch & Birch, LLP (57) ABSTRACT

A hearing aid device configured to be partly or fully inserted into the ear canal of a user is disclosed. The hearing aid device comprises a receiver (loudspeaker) adapted to generate and send an air-borne acoustic signal towards the eardrum when the hearing aid device is partly or fully inserted into the ear canal. The hearing aid device further comprises a microphone configured to receive acoustic signals. The hearing aid device comprises a processing unit configured to determine if the hearing aid device is posi-
(Continued)

tioned in a correct position in the ear canal on the basis of the acoustic signals received by the microphone.

20 Claims, 4 Drawing Sheets

(52) U.S. Cl.
CPC ..... H04R 25/652 (2013.01); *H04R 2225/023* (2013.01); *H04R 2225/025* (2013.01); *H04R 2460/17* (2013.01)

(56) References Cited

U.S. PATENT DOCUMENTS

| | | | | |
|---|---|---|---|---|
| 5,166,659 | A * | 11/1992 | Navarro | H04R 25/654 |
| | | | | 181/130 |
| 6,339,648 | B1 * | 1/2002 | McIntosh | H04R 25/658 |
| | | | | 181/130 |
| 7,313,245 | B1 * | 12/2007 | Shennib | A61F 11/08 |
| | | | | 128/864 |
| 9,107,011 | B2 * | 8/2015 | Broadley | H04R 29/00 |
| 2002/0085728 | A1 * | 7/2002 | Shennib | H04R 25/456 |
| | | | | 381/328 |
| 2007/0019817 | A1 * | 1/2007 | Siltmann | H04R 25/305 |
| | | | | 381/60 |
| 2007/0217639 | A1 * | 9/2007 | Stirnemann | H04R 25/70 |
| | | | | 381/321 |
| 2008/0123882 | A1 * | 5/2008 | Bauml | H04R 25/305 |
| | | | | 381/312 |
| 2008/0194984 | A1 * | 8/2008 | Keefe | A61B 5/121 |
| | | | | 600/559 |
| 2009/0129619 | A1 * | 5/2009 | Nordahn | H04R 25/70 |
| | | | | 381/328 |
| 2010/0318208 | A1 * | 12/2010 | Schiller | G06F 17/50 |
| | | | | 700/98 |
| 2011/0206225 | A1 | 8/2011 | Møller et al. | |
| 2011/0255723 | A1 * | 10/2011 | Obradovic | H04R 25/652 |
| | | | | 381/328 |
| 2013/0070946 | A1 * | 3/2013 | Kroman | H04R 25/558 |
| | | | | 381/315 |
| 2014/0050342 | A1 * | 2/2014 | Hau | H04R 25/305 |
| | | | | 381/328 |
| 2014/0301585 | A1 * | 10/2014 | Baer | H04R 25/604 |
| | | | | 381/322 |
| 2014/0330160 | A1 | 11/2014 | Sohn et al. | |
| 2015/0010158 | A1 * | 1/2015 | Broadley | H04R 29/00 |
| | | | | 381/58 |
| 2015/0043764 | A1 | 2/2015 | Rasmussen | |
| 2015/0073297 | A1 * | 3/2015 | Killion | A61B 5/6844 |
| | | | | 600/559 |

FOREIGN PATENT DOCUMENTS

| | | | | |
|---|---|---|---|---|
| DK | WO 2012107100 | A1 * | 8/2012 | ........... H04R 25/305 |
| DK | WO 2012149955 | A1 * | 11/2012 | ........... H04R 25/305 |
| DK | EP 2613566 | A1 * | 7/2013 | ........... H04R 25/305 |
| WO | WO 8901315 | A1 * | 2/1989 | ........... A61B 5/121 |
| WO | WO 2005/077011 | A2 | 8/2005 | |
| WO | WO 2010/049543 | A2 | 5/2010 | |
| WO | WO 2013/126749 | A1 | 8/2013 | |

* cited by examiner

HEARING AID DEVICE WITH POSITIONING GUIDE AND HEARING AID DEVICE SYSTEM

FIELD OF INVENTION

The present disclosure relates to a hearing aid device configured to be partly or fully inserted into the ear canal of a user. More particularly, the present disclosure relates to a hearing aid device that is easy for the user of the hearing aid device to place in the correct position in the ear canal.

BACKGROUND

Hearing aid devices that can be placed completely or almost completely in the ear canal are very popular, because they are suitable for most types of hearing losses and are relatively discreet. Some of these In-The-Ear (ITE) hearing aid devices can be placed deep in the ear canal.

It is difficult for the hearing aid user to place the hearing aid device in the optimum position in the ear canal, because the user cannot see when the optimum position is achieved. This is particularly the case with hearing aid devices, which are placed deep in the ear canal. If the hearing aid device is not placed in the correct position in the ear canal, the hearing aid user will not have an optimum hearing experience.

Therefore, it would be desirable to have a hearing aid device that is easier to place in the correct position in the ear canal.

Hearing aid devices are normally driven by a battery that needs to be replaced or recharged. Accordingly, it is required to remove the hearing aid device from the ear canal and replace or recharge the battery.

Therefore, the hearing aid user must do without the hearing aid device for a period.

Accordingly, it would be advantageous that the need for removing the hearing aid device for battery replacement or recharging of the battery could be eliminated.

SUMMARY OF THE INVENTION

Preferred embodiments of the present disclosure can be achieved by a hearing aid device as defined in claim 1 and by a hearing aid system as defined in claim 13. Other preferred embodiments are defined in the dependent sub claims, explained in the following description and illustrated in the accompanying drawings.

According to an aspect of the disclosure, the hearing aid device is configured to be partly or fully inserted into the ear canal of a user, which hearing aid device comprises a receiver (loudspeaker) adapted to generate and send an air-borne acoustic signal towards the eardrum when the hearing aid device is partly or fully inserted into the ear canal.

The hearing aid device further comprises a microphone configured to receive acoustic signals, and a processing unit configured to determine if the hearing aid device is positioned in a correct position in the ear canal on the basis of the acoustic signals received by the microphone.

Hereby, the hearing aid device (by means of the processing unit) can detect if and when the hearing aid device is positioned correctly in the ear canal. In this way, the hearing aid device can "guide" the hearing aid user in a manner that facilitates that an optimum position of the hearing aid device can be achieved.

The hearing aid device is configured to be partly or fully inserted into the ear canal of a user. The hearing aid device may e.g. by of any type having a part intended for being located in an ear canal of the user, such ITE-part comprising an output transducer (e.g. a loudspeaker) as well as an input transducer (e.g. a microphone). The hearing aid device may e.g. be an ITE hearing aid device such as a Completely-in-Canal (CIC) type hearing aid device or an invisible in-the-canal (IIC) hearing aid device or a Receiver in the ear (RITE) type hearing aid device (comprising a microphone and a loudspeaker configured to be located in the ear canal of a user). The receiver (loudspeaker) may be of any suitable type and configuration capable of generating and sending an air-borne acoustic signal towards the eardrum when the hearing aid device is partly or fully inserted into the ear canal. The hearing aid device further comprises a microphone configured to receive acoustic signals. The microphone may be of any suitable type and form. The microphone may be provided as a directional microphone assembly comprising one or more microphone members. The processing unit may be of any suitable type and configuration capable of determining if the hearing aid device is positioned in a correct position in the ear canal on the basis of the acoustic signals received by the microphone.

According to another aspect of the disclosure, the hearing aid device comprises a memory unit configured to store identification data. Hereby, it is possible to compare measured parameters/values with stored identification data and hereby determine if the position is correct. The stored identification data may comprise measurements or be determined on the basis of measurements, e.g. carried out by a hearing aid professional (e.g. an audiologist) by means of audiometric equipment, or be determined during use of the hearing aid device in a specific measurement mode.

According to yet another aspect of the disclosure, the identification data comprises a distance value. In an embodiment, the processing unit is configured to process reflections from acoustic signals reflected by the eardrum and determine the distance between the receiver and the eardrum on the basis of the reflections.

Hereby, it is possible to position the hearing aid device correctly in the ear canal on the basis of direct measurements of the distance between the receiver and the eardrum.

According to a further aspect of the disclosure, the identification data comprises an identification signal. In an embodiment, the processing unit is configured to process a predefined acoustic signal sound sent by the receiver and received by the microphone and determine if the signal received by the microphone corresponds to the predefined identification signal and hereby determine if the hearing aid device is positioned in a correct position in the ear canal.

Hereby, the correct position of the hearing aid device can be achieved by using the hearing aid device's "anti-feedback system" to determine if the hearing aid device is positioned correctly.

According to another aspect of the disclosure, the hearing aid device is configured to guide a user during mounting and/or demounting of the hearing aid device in and from, respectively, the ear canal of the user.

In an embodiment, the hearing aid device comprises a sound guide unit configured to generate an acoustic (audible) signal to the hearing aid user during positioning the hearing aid device in the ear canal, wherein the acoustic signal depends on the position of the hearing aid device.

Hereby, the user of the hearing aid device can be provided with a guiding feedback that facilitates a correct insertion of the hearing aid device.

In an embodiment, the hearing device is configured to play a specific test-signal (e.g. for a predefined period of time) when a power-on has been initiated.

In an embodiment, the hearing device is configured to estimate a current acoustic impedance of the output transducer. In an embodiment, an intended location of the hearing device in the ear canal of the user is identified based on a current acoustic impedance of the output transducer (e.g. by comparison with a stored reference value, e.g. measured during a fitting procedure).

According to yet another aspect of the disclosure, the acoustic signal generated by the sound guide unit is generated on the basis of comparison of the signal received by the microphone and the stored identification data.

Hereby, it is possible to generate an acoustic signal that depends on the difference between the signal received by the microphone and the stored identification data. It would by way of example be possible to let the volume, frequency or duration of a base signal (when a repetitive signal is applied) depend on the difference between the signal received by the microphone and the stored identification data. For instance, it is possible to generate a high volume or frequency when the difference is high or low.

According to a further aspect of the disclosure, the sound guide device is configured to stop generating an acoustic signal when a predefined position is achieved, preferably a position defined or measured relative to the eardrum.

Hereby, the acoustic signal can be ended when it is not needed anymore. This feature is user-friendly since it tells the user when the hearing aid device has been positioned correctly.

In a further exemplary scenario of using the "anti-feedback system" for correct placement of the hearing aid device, the disclosure also provides for using the feedback management system in a fitting scenario to set an acoustic signature indicative of an optimal placement of the hearing aid device in the ear canal. That is, when a hearing care professional sets the hearing device to the optimal settings for accounting for a hearing loss, the existing feedback manager functionality of the fitting system may be used to create an acoustic signature based on the feedback system curves measured during fitting. The feedback management curves, is indicative of placement of the hearing aid device in the ear, and a feedback curve found to be optimal regarding placement, may be set and stored in the hearing aid device to be indicative of an acoustic signature. Subsequently, when the hearing aid device is in use, the existing feedback management system of the hearing aid device, measures the acoustic feedback. The subsequent on-the-go measurements of acoustic feedback performed by the hearing aid will in addition to adjust the feedback level during use, also be able to detect a potential displacement (i.e. a deviation of the feedback curve from the set and stored acoustic signature) of the hearing aid device in the ear. Such detection may be communicated to the hearing aid user, by the hearing aid device, whereby the user as a consequence thereof may adjust the position of the hearing aid. According to yet another aspect of the disclosure, the hearing aid device comprises a coil member configured to generate an electrical current when exposed to a varying magnetic field.

Hereby, it is possible to extract power from an electromagnetic field provided e.g. by means of a charging unit and convert it into electrical current to charge the battery of the hearing aid device. In one embodiment according to the disclosure, an inductive charging system that uses a resonant inductive coupling is applied in order to allow for a larger distance between the coil member and the second coil applied to generate the varying electromagnetic field.

According to an aspect of the disclosure, a hearing aid system comprising a hearing aid device configured to be partly or fully inserted into the ear canal of a user is provided. In an embodiment, the hearing aid system comprises a tool for positioning the hearing aid device in the ear canal, which tool comprises a connection structure, which connection structure is provided with a magnetic or magnetizable member in its distal end.

Hereby, the user of the hearing aid device can easier insert and remove the hearing aid device.

According to another aspect of the disclosure, the hearing aid system further comprises a charging device comprising a coil configured to generate a varying magnetic field.

Hereby, the charging device can be applied to generate a varying magnetic field and hereby generate an electrical current in the coil member of the hearing aid device, and thus charge the battery of the hearing aid device.

According to yet another aspect of the disclosure, the charging device is a behind-the-ear (BTE) charging device configured to be attached behind the ear, wherein the charging device (40) comprises a battery.

Such charging device is capable of providing wireless charging while the hearing aid device is still positioned in the ear canal. Accordingly, it is possible to leave the hearing aid device in the ear canal for longer time periods since removal of the hearing aid device is not required.

According to a further aspect of the disclosure, the hearing aid device comprises a sealing retainer (dome) adapted to be seated within and occlude the bony region of the ear canal and to support the hearing aid device in said bony region when the hearing aid device is fully seated in the ear canal, whereby said sealing retainer provides acoustic sealing of said bony region of the ear canal to prevent or reduce acoustic feedback.

Hereby, it is possible to enhance the comfort for the user of the hearing aide device since acoustic feedback can be reduced or even eliminated.

According to an even further aspect of the disclosure, the hearing aid device is provided with a connection surface configured to engage with the magnetic or magnetizable member of the connection structure.

Hereby, it is possible to ease the contact and coupling between the hearing aid device and an external member (e.g. a tool for insertion and removal of the hearing aid device).

According to a further aspect of the disclosure, the tool or the hearing aid device comprises an electromagnet configured to generate a magnetic field capable of attracting or repelling an opposite magnetic or magnetizable member, wherein the tool comprises an activation unit configured to directly or indirectly activate the electromagnet and hereby make it attract or repel an opposite magnetic or magnetizable member.

Hereby, it is possible to apply a magnetic force to couple or uncouple the tool and the hearing aid device.

According to another aspect of the disclosure, the tool is provided with an activation button adapted to create an electrical connection that activates an activation unit that hereby activates an electromagnet provided in the distal end of the connection structure, wherein the electromagnet attracts or repels an opposite magnetic or magnetizable member provided at the hearing aid device.

By using the activation button it is possible to control when the electromagnet should attract or repel the opposite magnetic or magnetizable member provided at the hearing aid device. Hereby, a more user-friendly solution can be achieved.

According to yet another aspect of the disclosure, two or more (e.g. three) radially extending arms are provided in the distal end of the connection structure, wherein the hearing aid device comprises two or more non-magnetic wire members and an angled slide configured to guide the arms of the tool in an engaging position within the wire members.

Hereby, it is possible to guide the arms of the tool in an engaging position within the wire members.

According to a further aspect of the disclosure, a first permanent magnet is provided centrally at the distal end of the connection structure, wherein a second permanent magnet is provided centrally at the end portion of the hearing aid device.

Hereby, the tool and the hearing aid device can be coupled by means of the permanent magnets in an easy manner. Moreover, a simple and reliable coupling mechanism can be achieved.

According to another aspect of the disclosure, the arms, the wire members and the angled slide are shaped in such a manner that the hearing aid device is translated along its longitudinal axis due to rotation of the tool, when the arms of the tool are brought into engagement with the wire members and the angled slide of the hearing aid device.

Hereby, it is possible to provide a simple and reliable way of coupling and decoupling the tool and the hearing aid device.

According to another aspect of the disclosure, the hearing aid device is a hearing aid device according to the disclosure.

In a further aspect of the disclosure, the hearing aid device comprising a processing unit for positioning determination may in concurrence with the tool for positioning of the hearing device in the ear, together define a hearing aid positioning system. The hearing aid positioning system may preferably be intended for at least deep in the ear hearing solutions, wherein the hearing aid device is intended for deep insertion into the ear canal. In such solutions, the insertion of the hearing aid device is intended to be so deep in the ear, that a simply finger insertion thereof would at least in some solutions not be sufficient.

Accordingly, the disclosure provides for a hearing aid positioning system, comprising a hearing aid device and an insertion tool, said hearing aid device of said system comprises a first connection structure and said tool for insertion comprises a second connection structure, wherein said first and second connection structures are configured to engage with each other, wherein the hearing aid device, further comprises a processing unit configured to determine a position of said hearing aid device within the ear canal and output a control signal to a user of the hearing aid, such that the depth of insertion of the hearing aid device into the ear canal by use of the insertion tool is controlled by a control signal from the signal processing unit.

The features and structure of the elements of the hearing aid system corresponds to the previously described aspects and embodiments. Thus, the hearing aid device used in said system may constructed as previously defined, and similarly the insertion tool, may be constructed as previously defined.

In effect the hearing aid positioning system aids in correct positioning of the hearing device, in that an insertion tool of the system guides the hearing device into the ear canal by control of a user, while at the same time the user is guided by a positioning determination of a processing unit of the hearing device to determine the correct position in relation to at least depth into the ear canal. The concurrent functionality and detection of the positioning, as provided by the processing unit of hearing aid upon insertion in the ear canal is in accordance with the previously described aspects. By the cooperation between the tool for insertion and the positioning detection, a hearing aid wearer is informed of correct placement of the hearing aid in the ear canal, and potential damage to structures of the ear canal is prevented.

BRIEF DESCRIPTION OF THE DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effects will be apparent from and elucidated with reference to the illustrations described hereinafter in which:

DETAILED DESCRIPTION OF THE INVENTION

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus are described by various blocks, functional units, modules, components, steps, processes etc. (collectively referred to as "elements"). Depending upon the particular application, design constraints or other reasons, these elements may be implemented using electronic hardware, computer programs, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. Computer programs shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

A hearing aid device may include a hearing aid that is adapted to improve or augment the hearing capability of a user by receiving an acoustic signal from a user's surroundings, generating a corresponding audio signal, possibly modifying the audio signal and providing the possibly modified audio signal as an audible signal to at least one of the user's ears. The "hearing aid device" may further refer to a device adapted to receive an audio signal electronically, possibly modifying the audio signal and providing the possibly modified audio signals as an audible signal to at least one of the user's ears. Such audible signals may be provided in the form of an acoustic signal radiated into the user's outer ear.

The hearing aid device is adapted to be arranged in the ear canal of the user such as in an In-the-Canal hearing aid or a Completely-in-Canal type hearing aid.

A "hearing system" refers to a system comprising one or two hearing aid devices. The hearing system may include auxiliary devices that complement the functionality of the hearing aid device(s), e.g. related to ease of handling the hearing aid device(s), e.g. to tools for proper placement or removal of the hearing aid device(s). The hearing system may also or alternatively include auxiliary device(s) that communicates with at least one hearing aid device, the auxiliary device affecting the operation of the hearing aid devices and/or benefiting from the functioning of the hearing aid devices. A wired or wireless communication link between the at least one hearing aid device and the auxiliary device is established that allows for exchanging information (e.g. control and status signals, possibly audio signals) between the at least one hearing aid device and the auxiliary device. Such auxiliary devices may include at least one of the following: remote controls, remote microphones, audio gateway devices, mobile phones, public-address systems, car audio systems or music players or a combination thereof. The audio gateway is adapted to receive a multitude of audio signals such as from an entertainment device like a TV or a music player, a telephone apparatus like a mobile telephone or a computer, or a PC. The audio gateway is further adapted to select and/or combine an appropriate signal out of the received audio signals (or combination of signals) for transmission to the at least one hearing aid device. The remote control is adapted to control functionality and operation of the at least one hearing aid devices. The function of the remote control may be implemented in a SmartPhone or another electronic device, the SmartPhone/electronic device possibly running an application that controls functionality of the at least one hearing aid device.

In general, a hearing aid device includes i) an input unit such as a microphone for receiving an acoustic signal from a user's surroundings and providing a corresponding input audio signal, and/or ii) a receiving unit for electronically receiving an input audio signal. The hearing aid device further includes a signal processing unit for processing the input audio signal and an output unit for providing an audible signal to the user in dependence on the processed audio signal.

The input unit may include multiple input microphones, e.g. for providing direction-dependent audio signal processing. Such a directional microphone system is adapted to enhance a target acoustic source among a multitude of acoustic sources in the user's environment. In one aspect, the directional system is adapted to detect (such as adaptively detect) from which direction a particular part of the microphone signal originates. This may be achieved by using conventionally known methods. The signal processing unit may include an amplifier that is adapted to apply a frequency dependent gain to the input audio signal. The signal processing unit may further be adapted to provide other relevant functionality such as compression, noise reduction, etc. The output unit may include an output transducer such as a loudspeaker/receiver for providing an air-borne acoustic signal transcutaneously or percutaneously to the skull bone or a vibrator for providing a structure-borne or liquid-borne acoustic signal. In some hearing aid devices, the output unit may include one or more output electrodes for providing the electric signals such as in a Cochlear Implant.

Figure 1A:
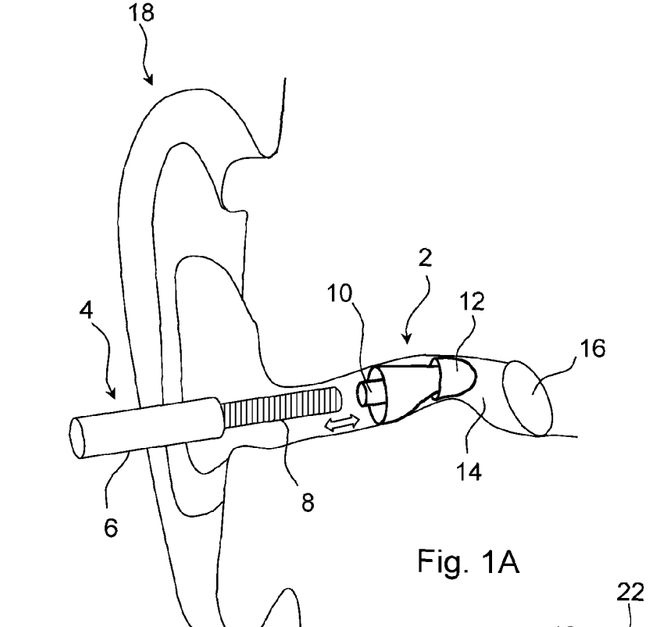
FIG. 1A shows a perspective view of a hearing aid system according to an embodiment of the disclosure.

Referring now in detail to the drawings for the purpose of illustrating preferred embodiments and the described aspects of the disclosure, FIG. 1A illustrates a schematic view of a hearing aid device 2 according to an embodiment of the disclosure. The hearing aid device 2 comprises a central body portion provided between an elongated connection member 10 and a dome 12. The hearing aid device 2 is a completely-in-canal hearing aid device 2. The hearing aid device 2 has been positioned in the ear canal 14 in a position in which distance from the eardrum 16 is optimum (e.g. some mm, e.g. between 2 mm and 4 mm). The insertion of the hearing aid device 2 is preferably carried out by means of a tool 4. The tool 4 comprises holding structure 6 shaped as a basically cylindrical grip extending in extension of an elongated connection structure 8.

The connection structure 8 is configured to be brought into engagement with the end portion of the elongated connection member 10 of the hearing aid device 2. The engagement between the connection structure 8 and the elongated connection member 10 of the hearing aid device 2 may be established by means of engaging mechanical structures (not shown) and/or engaging structures including magnetic structures (see e.g. FIGS. 2, 3A, 3B).

This may be provided with gripping members configured to engage with corresponding engaging structures provided on the connection member 10.

The connection structure 8 may be cylindrical and preferably have a slightly smaller width (e.g. diameter) than the holding structure 6.

Figure 1B:
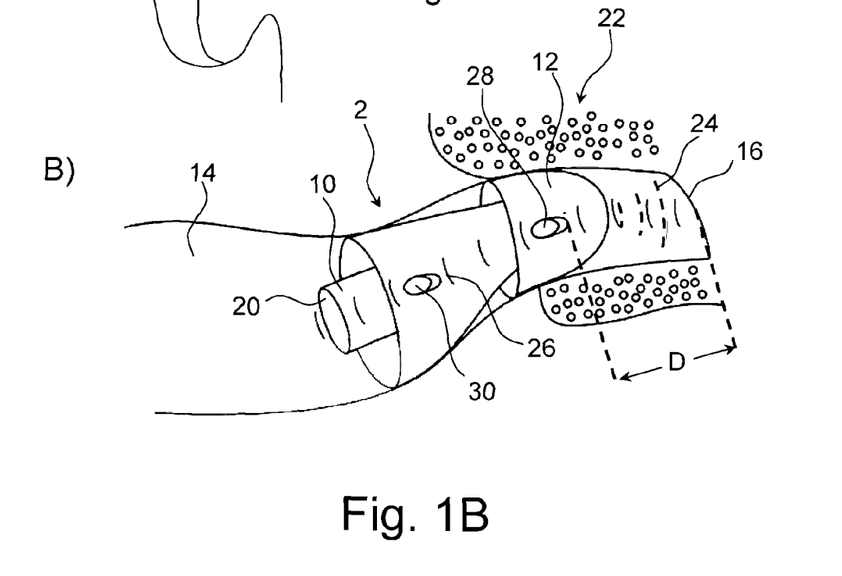
FIG. 1B shows a close-up view of a hearing aid device according to an embodiment of the disclosure.

FIG. 1B illustrates a close-up view of a hearing aid device 2 according to an embodiment of the disclosure. The hearing aid device 2 is being positioned (at least partially) in the bony region 22 of the ear canal 14. The hearing aid device 2 is positioned in the ear canal 14 in a position in which the distance to the eardrum 16 is optimum. This is e.g. achieved by applying either "active sonar" or "an acoustic signature", as described in the summary of the disclosure.

When "active sonar" is applied, sound waves 24 from the loudspeaker 28 of the hearing aid device 2 are transmitted in direction towards the eardrum 16. The sound waves 24 are reflected by the eardrum 16 (cf. reflected sound waves 26 in FIG. 1B) and are picked up by the microphone 30 of the hearing aid device 2. Hereby, the distance D between the loudspeaker 28 and the eardrum 16 can be established.

At the time of fitting the hearing aid device 2, an audiologist or hearing instrument specialist ensures correct placement of the hearing aid device 2 in the ear canal 14. During this session, the "sonar system" of the hearing aid device 2 measures the optimum distance D between the loudspeaker 28 and the eardrum 16 in the "optimum" position.

Afterwards, when the user of the hearing aid device 2 (or a helping person) inserts the hearing aid device 2 into the ear, the "sonar system" will detect the distance D between the loudspeaker 28 and the eardrum 16 during insertion. It may be an advantage that the hearing aid device 2 comprises a sound guide device configured to emit a beeping sound to guide the hearing aid user during positioning the hearing aid device in the ear canal 14. The guidance may be carried out by applying a sound guide device that emits a beeping sound until the hearing aid device 2 is placed in a position in which the distance D between the loudspeaker 28 and the eardrum 16 is optimum. In an embodiment, the sound guide device comprises the loudspeaker 28.

In an embodiment, the hearing aid device is configured so that the loudspeaker can issue sound waves 24 used to determine a (possibly relative, e.g. to the predefined intended position) distance to the eardrum as well as the guiding sound (e.g. beeps). In an embodiment, the sound waves 24 and the guiding sound are issued sequentially (issue sound waves—detect current distance—issue guiding sound, then repeat). In an embodiment, the sound waves 24 and the guiding sound are issued simultaneously (overlapping), e.g. in that different frequency ranges (and possibly levels) are used for the two types of signals.

It may be an advantage that the sound guide device is configured to stop beeping when the optimum position is achieved. In this manner, the hearing aid user will know that the hearing aid device 2 is positioned correctly. This will make it easier for the hearing aid user to arrange the hearing aid device 2 correctly over and over again. The use of such sound guide device is applicable in both in-the-ear (ITE) hearing aid devices and receiver-in-the-ear (RITE) hearing aid devices.

As an alternative to the use of a "sonar system", it is possible to apply a "acoustic signature method", in which the feedback-path model of the hearing aid device's "anti-feedback system" (if present) is used in a fashion almost similar to the one applied by using the "sonar system".

At the time of fitting the hearing aid device 2, an audiologist or hearing instrument specialist ensures correct placement of the hearing aid device 2 in the ear canal 14. At the same time the "signature" feedback path model (from the loudspeaker 28 to the hearing instrument's microphone 30) is measured e.g. by means of a broadband noise signal and adaptive system-identification methods.

When the hearing aid user inserts the hearing aid device 2 into his own ear, the feedback path is measured (using the broadband noise signal) during insertion. When there is a sufficiently good match (based on a predefined criterion) between the current feedback path model and the signature, the broadband noise signal stops, and the hearing aid device user will know that the hearing aid device 2 is positioned in the correct position. The matching between the adaptive feedback path model and the signature may be carried out in the time domain or in the frequency domain. The determination of whether a "sufficiently good match" is established by using a predefined criterion defining the range of acceptance.

Accordingly the "anti-feedback system" of the hearing aid may be used for positioning determination.

Further elaboration of an exemplary scenario of using the "anti-feedback system" for correct placement of the hearing aid device, the disclosure also provides for using the feedback management system in a fitting scenario to set the acoustic "signature" indicative of an optimal placement of the hearing aid device in the ear canal. In concordance with the previously disclosure, an example providing such acoustic signature could include the following scenario. When a hearing care professional sets the hearing device to the optimal settings for accounting for a hearing loss, the existing feedback manager functionality of for example the fitting system normally used for fitting hearing aids, may be used to create an acoustic signature based on the feedback system curves measured during the fitting procedure. The feedback management curves, is indicative of placement of the hearing aid device in the ear, and a feedback curve found to be optimal regarding placement, may be set and stored in the hearing aid device to be indicative of an acoustic signature. Subsequently, when the hearing aid device is in use, the existing feedback management system of the hearing aid device, measures the acoustic feedback. The subsequent on-the-go measurements of acoustic feedback performed by the hearing aid will in addition to adjust the feedback level during use, also be able to detect a potential displacement (i.e. a deviation of the feedback curve from the set and stored acoustic signature) of the hearing aid device in the ear. Such detection may be communicated to the hearing aid user, by the hearing aid device, whereby the user as a consequence thereof may adjust the position of the hearing aid.

The hearing aid user may be informed by the incorrect and/or correct placement of the hearing aid directly by using the speaker of the hearing aid, or potentially also by using a remote device, being in wirelessly communication with the hearing aid. That is, the hearing device would be configured to communicate changes in the feedback path related to positioning, to a remote device, such as an APP on a telephone, whereby the user would be informed about incorrect placement.

Although not shown in FIG. 1B, it may be preferred that a tool is applied during insertion of the hearing aid device 2 into the ear canal 14. The tool may correspond to the one illustrated in FIG. 1A. That is, in embodiments of the invention it should be apparent for a person skilled in the art that a hearing positioning system comprising a tool for insertion and the positioning determination concurrently is provided for throughout the disclosure.

Figure 2:
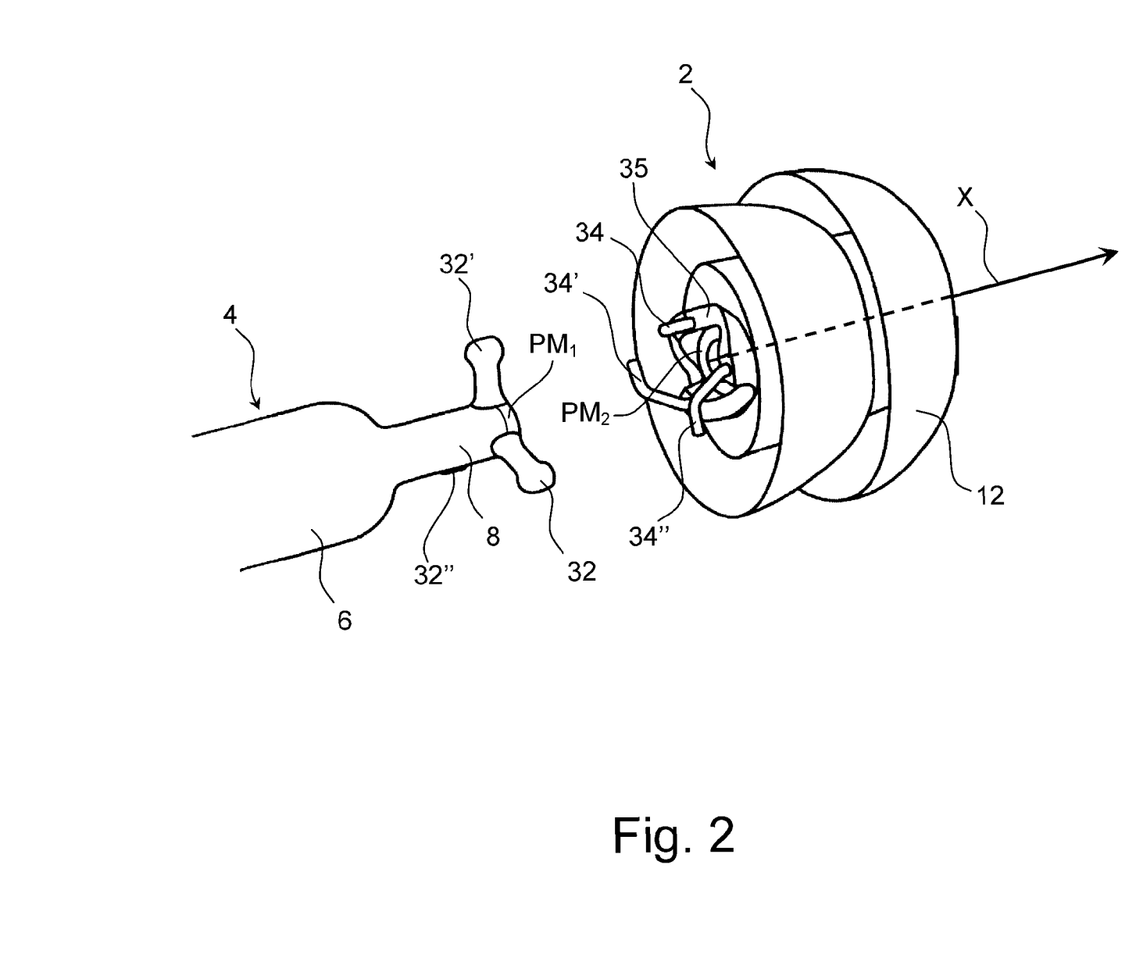
FIG. 2 shows a schematic perspective view of a first hearing aid device and a tool for inserting (or removing) the hearing aid device into (or from) the ear canal.

FIG. 2 illustrates a schematic perspective view of a hearing aid system comprising a hearing aid device 2 and a tool 4 for inserting the hearing aid device 2 into the ear canal according to an embodiment of the disclosure. The tool 4 comprises a holding structure 6. The holding structure 6 is formed as a basically cylindrical grip. The holding structure 6, however, may be provided as a grip having any other suitable shape, preferably an elongated form.

A connection structure 8 extends in extension of the holding structure 6. The connection structure 8 may preferably extend parallel to the longitudinal axis X of the elongated holding structure 6. Three arms 32, 32', 32" are provided in the distal end of the connection structure 8. The arms 32, 32', 32" are basically I-shaped and extend radially relative to the connection structure 8.

The connection structure 8 is preferably sufficiently long to allow a placement of the hearing aid device in an intended position relative to the ear drum in an ear canal of the user. In an embodiment, the connection structure 8 is made of a resilient material (e.g. comprising plastic) that allows the tool to comply with possible curvature of the ear canal of the user while allowing the tool 4 to perform its function.

A permanent magnet $PM_1$ is provided centrally at the distal end of the connection structure 8.

A hearing aid device 2 is arranged next to the tool 4. The hearing aid device 2 is configured to be arranged completely in the ear canal. A permanent magnet $PM_2$ is provided in the end region of the hearing aid device 2. The permanent magnet $PM_2$ is shaped and configured to be brought into engaging contact with the permanent magnet $PM_1$ provided at the distal end of the connection structure 8 of the tool 4. The permanent magnet $PM_2$ has an opposite magnetic pole facing the permanent magnet $PM_1$ provided at the distal end of the connection structure 8 of the tool 4.

The hearing aid device 2 furthermore comprises three non-magnetic wire members 34, 34', 34" and an angled slide 35, which guides the arms 32, 32', 32" of the tool 4 in an engaging position within the wire members 34, 34', 34". As an alternative, it is possible to apply a battery to generate an electromagnet by means of a coil (not shown) or to apply a magnetisable material, (e.g. steel) to replace one of the permanent magnets $PM_1$, $PM_2$. It is possible to replace either of the permanent magnets $PM_1$ or $PM_2$ with an electromagnet. Further, it is possible to provide the tool 4 with an activation member adapted to activate the electromagnet. Such an activation member can be applied to activate an electromagnet provided at the distal end of the tool. However, it is also possible to apply an activation member to activate an electromagnet provided at the hearing aid device 2 (e.g. by establishing an electric connection between the tool 4 and the hearing aid device 2 by means of one or more of the arms 32, 32', 32". The use of a controllable electromagnet is particularly advantageous, when the hearing aid device has been placed in the intended position of the ear canal and the tool has to be removed.

Once the hearing aid device 2 has been properly inserted into the ear canal, the tool 4 may be removed by rotating it reversely. Friction between the dome 12 of the hearing aid device 2 and the ear canal may be sufficient to ensure that the hearing aid device 2 will be fixed (restricted from rotating) when the tool 4 is rotated.

When a hearing aid device 2 is configured to be completely hidden in the ear canal, it is normally difficult to position and remove such hearing aid device 2. Therefore, use of a tool 4 with a magnetic connection between the distal end of the tool 4 and the hearing aid device 2 may be beneficial. The tool 4 can be used to ensure that the first contact between the tool 4 and the hearing aid device 2 is established in a desired manner. The tool 4 illustrated in FIG. 2 automatically rotates itself in an engaging position relative to the hearing aid device 2. Accordingly, the hearing aid user can take out the hearing aid device 2 using the arms 32, 32', 32" of the tool 4 and the wire members 34, 34', 34".

To release the tool 4 from engagement with the hearing aid device 2, the tool 4 needs to be rotated in the opposite direction than the direction applied during insertion of the hearing aid device 2 into the ear canal. The angled slide comprises a structure that will ensure that the tool is translated away from the hearing aid device 2 and thus ensuring a disengagement of the hearing aid device 2 and the tool 4, as a response to rotation of the tool 4 relative to the hearing aid device 2. Accordingly, when the tool 4 has been rotated relative to the hearing aid device 2, the tool can be released from the wire members 34, 34', 34" and the permanent magnet $PM_2$, so that the tool 4 can be removed from the ear canal while the hearing aid device 2 is positioned inside the ear canal.

Figures 3A, 3B:
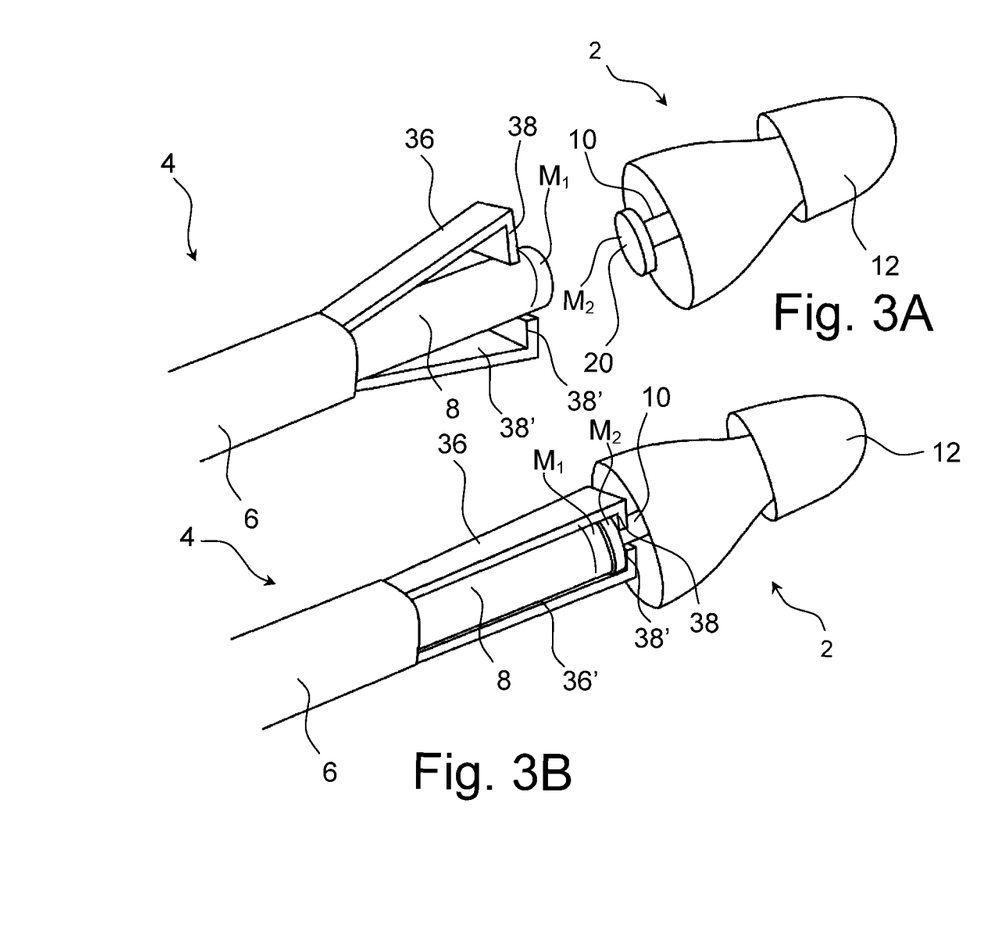
FIG. 3A shows a schematic perspective view of another hearing aid device and a tool for inserting (or removing) the hearing aid device into (or from) the ear canal.
FIG. 3B shows the tool 4 attached to the hearing aid device 2 illustrated in FIG. 3A.

FIG. 3A illustrates a schematic perspective view of a hearing aid device 2 and a tool 4 for inserting the hearing aid device 2 into the ear canal according to an embodiment of the disclosure. The tool 4 comprises a holding structure 6 formed as a basically cylindrical grip. The holding structure 6 may take any other suitable form.

The tool 4 further comprises a connection structure 8 extending in extension for the distal end of the holding structure 6. The connection structure 8 is shaped as an elongated cylindrical body, however, the connection structure 8 may take other forms.

A first gripping member 36 provided with a hook member 38 in its distal end is attached to the holding structure 6. At the opposite side of the holding structure 6 a second gripping member 36' provided with a hook member 38' in its distal end is provided. The gripping members 36, 36' are plate-shaped and the hook members 38, 38' extend basically perpendicular to the gripping members 36, 36'. The hook members 38, 38' are shaped as rectangular plate members.

A magnet $M_1$ is provided at the distal end of the connection structure 8. The magnet M may be a permanent magnet or an electromagnet that can be activated by means of the tool 4, e.g. by pressing an activation button (not shown) adapted to create an electrical connection to the electromagnetic.

A hearing aid device 2 is arranged in front of the tool 4. The hearing aid device 2 comprises a central body member and a dome 12 attached to the distal end of the body member. The hearing aid device 2 is adapted to be arranged completely in the ear canal.

A magnet (or magnetizable element, e.g. of a soft magnetic material) $M_2$ is provided in the proximal end of the hearing aid device 2. The magnet $M_2$ is shaped and configured to be brought into engaging contact with the magnet $M_1$ provided at the distal end of the connection structure 8 of the tool 4 in order to provide a magnetic attraction between the two magnets $M_1$, $M_2$.

The magnet $M_2$ is attached to a connection member 10 that is further attached to the central body member of the hearing aid device 2. The magnet $M_2$ comprises a connection surface 20 configured to bear against the magnet $M_1$ of the tool 4. Preferably the connection surface 20 form part of an engaging structure (shown as a disk formed body in FIG. 3), thereby allowing the tool 4 (in particular the gripping and hook members) to allow an engaging attachment of the tool to the hearing aid device to be established.

FIG. 3B illustrates the tool 4 attached to the hearing aid device 2 illustrated in FIG. 3A. The magnet $M_1$ of the tool 4 has been brought into contact with the magnet $M_2$ of the hearing aid device 2. Further, the gripping members 36, 36' extend parallel to the connection structure 8. Moreover, the hook members 38, 38' have been brought together, thereby providing an engaging attachment of the tool 4 to the connection member 10 (and engaging structure) and thus the hearing aid device 2. The hook members 38, 38' extend basically perpendicular to the connection structure 8.

In this configuration, the tool 4 may be used to insert the hearing aid device 2 properly into the ear canal by the hearing aid user. The tool 4 can also be used to remove the hearing aid device 2 from the ear canal.

If the magnet $M_1$ is provided as an electromagnet, it is possible to control the magnetic attraction between the magnet $M_1$ of the tool and the magnet $M_2$ of the hearing aid device 2. It would be possible to cancel the magnetic attraction between the magnet $M_1$ of the tool and the magnet $M_2$ of the hearing aid device 2 when the tool 4 is intended to be removed from the ear canal. Hereby, the tool 4 will not provide a magnetic attractive force pulling the hearing aid device 2 in a direction towards the opening of the ear.

The hearing aid device 2 comprises a core assembly comprising a transducer unit (not shown) for converting sound waves incident thereon to audible signals to be imparted on the eardrum of the user of the hearing aid device 2.

The hearing aid device 2 further comprises a sealing retainer module comprising a dome (sealing retainer) 12 fabricated and adapted to seat within and occlude the bony region of the ear canal and hereby snugly support said core assembly along the longitudinal axis of the ear canal (at least partially) in the bony region when the hearing aid device 2 is fully seated in the ear canal. Hereby, the dome 12 provides acoustic sealing of the bony region of the ear canal. The dome, hereby, is capable of preventing acoustic feedback. A battery assembly including a battery for powering the hearing aid device is provided in the hearing aid device 2.

The hearing aid device 2 comprises a sound port for receiving incoming sound and delivering said incoming sound to a microphone within the hearing aid device 2.

As explained with reference to FIG. 4A and FIG. 4B, the battery in the hearing aid device may be wirelessly charged by means of a charging station comprising a primary coil configured to generate an electromagnetic field to transfer energy between the charging station and the hearing aid device 2. Alternatively, the hearing aid device may comprise a non-rechargeable battery (e.g. a Zn-Air battery) that must be changed when depleted. This has the advantage that no charging contacts or electronic components for receiving and controlling a wireless charging process are necessary in the hearing aid device.

Figure 4A:
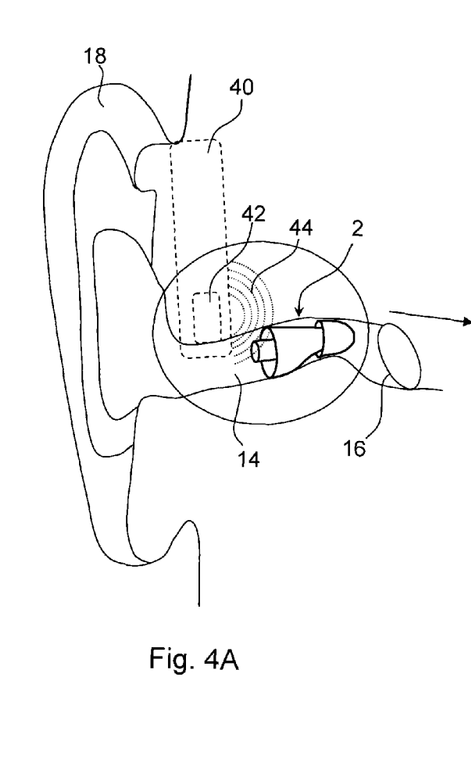
FIG. 4A illustrates a schematic view of a hearing aid device 2 arranged in the ear canal of a hearing aid device user in a situation, where the battery is being wirelessly charged.

FIG. 4A illustrates a schematic view of a hearing aid device 2 arranged in the ear canal 14 in a distance from the eardrum 16 of a hearing aid device user. A charging station 40 is provided behind the ear 18 of the user. The charging station 40 comprises a primary coil 42 configured to generate an electromagnetic field 44 to transfer energy between the charging station 40 and the hearing aid device 2.

Figure 4B:
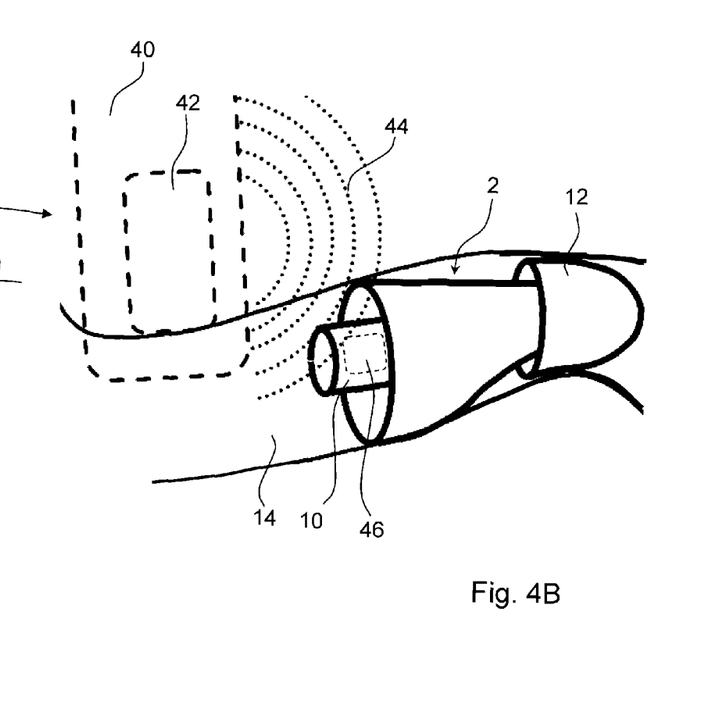
FIG. 4B illustrates a close-up view of the hearing aid device 2 shown in FIG. 4A.

FIG. 4B illustrates a close-up view of the hearing aid device 2 shown in FIG. 4A. The hearing aid device 2 comprises a second coil 46 provided in the connection member 10 of the hearing aid device 2. The primary coil 42 in the charging station 40 generates an electromagnetic field 44 by means of which energy is transferred between the charging station 40 and the hearing aid device 2.

Energy is sent through the inductive coupling to the hearing aid device 2, which uses the energy to charge a battery (not shown) provided in the hearing aid device 2.

The induction coil 42 in the charging station 40 creates an alternating electromagnetic field 44. The second induction coil 46 takes power from the electromagnetic field 44 and converts it into electrical current to charge the battery of the hearing aid device 2. It is possible to apply an inductive charging system that uses a resonant inductive coupling in order to allow a larger distance between the first coil 42 and the second coil 46.

By using the charging station 40 shown in FIG. 4A and in FIG. 4B, it is possible to charge and recharge the hearing aid device 2 when it is still arranged in the ear canal 14. In many situations, it would be beneficial to be capable of providing such transfer of power (and thus recharging the hearing aid device 2) without removal of the hearing aid device 2 from the ear canal 14. The hearing aid device 2 may stay in the ear for long time periods since no battery replacement is needed. Since the position of the charging station 40 and the hearing aid device 2 is well defined, it is possible to optimise the energy transfer in order to achieve a fast and efficient charging of the battery.

It is possible to apply the positioning technique explained with reference to FIG. 1A and FIG. 2 in combination with the wireless charging previously described. Hereby, it would be possible to optimise the position of the hearing aid device 2 in order to provide the most optimum position for carrying out an efficient wireless charging and at the same time provide the best possible sound for the hearing aid user.

As is apparent from the disclosure, the processing unit of the hearing aid device may in concurrence with the tool for positioning of the hearing device in the ear, together define a hearing aid positioning system. The hearing aid positioning system may preferably be intended for at least deep in the ear hearing solutions, wherein the hearing aid device is intended for deep insertion into the ear canal. In such solutions, the insertion of the hearing aid device is intended to be so deep in the ear, that a simply finger insertion thereof would at least in some solutions not be sufficient.

Thus, in a further aspect of the disclosure, the hearing aid device comprising a processing unit for positioning determination may in concurrence with the tool for positioning of the hearing device in the ear, together define a hearing aid positioning system. The hearing aid positioning system may preferably be intended for at least deep in the ear hearing solutions, wherein the hearing aid device is intended for deep insertion into the ear canal. In such solutions, the insertion of the hearing aid device is intended to be so deep in the ear, that a simply finger insertion thereof would at least in some solutions not be sufficient. In accordance herewith, it is apparent from any one of at least FIGS. 1A, 2A, 2B, 3A, 3B how the elements, such as the hearing aid device and the insertion tool could be constructed. Thus, features previously described with regards to these figures also accounts for the hearing aid positioning system.

Accordingly, the hearing aid positioning system aids in correct positioning of the hearing device, in that an insertion tool of the system guides the hearing device into the ear canal by control of a user, while at the same time the user is guided by a positioning determination of a processing unit of the hearing device to determine the correct position in relation to at least depth into the ear canal. The concurrent functionality and detection of the positioning, as provided by the processing unit of hearing aid upon insertion in the ear canal is in accordance with the previously described aspects. By the cooperation between the tool for insertion and the positioning detection, a hearing aid wearer is informed of correct placement of the hearing aid in the ear canal, and potential damage to structures of the ear canal is prevented. As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

LIST OF REFERENCE NUMERALS

2 Hearing aid device
4 Tool
6 Holding structure (grip)
8 Connection structure
10 Connection member
12 Dome
14 Ear canal
16 Eardrum
18 Ear
20 Connection surface
22 Bony region
24 Transmitted signal
26 Reflected signal
28 Loudspeaker
30 Microphone
D Distance
$PM_1$, $PM_2$ Permanent magnet
$M_1$ $M_2$ Magnet
X Longitudinal axis
32, 32', 32" Arm
34, 34', 34" Wire member
35 Angled slide
36, 36' Gripping member
38, 38' Hook member
40 Charging station
42 Coil
44 Electromagnetic field
46 Coil

The invention claimed is:

1. A hearing aid device configured to be partly or fully inserted into the ear canal of a user, the hearing aid device comprising:
a receiver (loudspeaker) adapted to generate and send an air-borne acoustic signal towards the eardrum when the hearing aid device is partly or fully inserted into the ear canal;
a microphone configured to receive acoustic signals; and
a processing unit configured to determine if the hearing aid device is positioned in a correct position in the ear canal on the basis of the acoustic signals received by the microphone,
wherein a first end of the hearing aid device is configured with an elongated connection member having a connection surface comprising a magnetic or magnetizable structure, and wherein the hearing aid device comprises an engaging structure on said first end configured to engage with a tool, wherein the tool comprises:
a holding structure configured to be gripped by a user,
a connection structure extending from said holding structure, and provided with a magnetic or magnetizable member configured to engage with said magnetic or magnetizable member of said hearing aid, and
a mechanical engagement structure, wherein said mechanical engagement structure is configured to connect with at least a part of the elongated connection member of said hearing aid, wherein said tool is configured to be handled by a user for guiding the hearing aid into the ear of a user.

2. The hearing aid device according to claim 1, wherein the hearing aid device comprises a memory unit configured to store identification data.

3. The hearing aid device according to claim 2, wherein the identification data is a distance value and the processing unit is configured to process reflections from acoustic signals reflected by the eardrum and determine the distance between the receiver and the eardrum on the basis of the reflections.

4. The hearing aid device according to claim 2, wherein the identification data is an identification signal, and the processing unit is configured to process a predefined acoustic signal sound sent by the receiver and received by the microphone and determine if the signal received by the microphone corresponds to the predefined identification signal and hereby determine if the hearing aid device is positioned in a correct position in the ear canal.

5. The hearing aid device according to claim 1, wherein the hearing aid device comprises a sound guide unit configured to generate an acoustic signal to the hearing aid user during positioning the hearing aid device in the ear canal, wherein the acoustic signal depends on the position of the hearing aid device.

6. The hearing aid device according to claim 5, wherein the acoustic signal generated by the sound guide unit is generated on the basis of comparison of the signal received by the microphone and the stored identification data.

7. The hearing aid device according to claim 5, wherein the sound guide device is configured to stop generating an acoustic signal when a predefined position is achieved, preferably a position defined or measured relative to the eardrum.

8. The hearing aid device according to claim 1, wherein the hearing aid device comprises a sealing retainer (dome) adapted to seat within and occlude the bony region of the ear canal and to snugly support the hearing aid device in said bony region when the hearing aid device is fully seated in the ear canal, whereby said sealing retainer provides acoustic sealing of said bony region of the ear canal to prevent or reduce acoustic feedback.

9. The hearing aid device according to claim 3, wherein the identification data is an identification signal, and the processing unit is configured to process a predefined acoustic signal sound sent by the receiver and received by the microphone and determine if the signal received by the microphone corresponds to the predefined identification signal and hereby determine if the hearing aid device is positioned in a correct position in the ear canal.

10. The hearing aid device according to claim 2, wherein the hearing aid device comprises a sound guide unit configured to generate an acoustic signal to the hearing aid user during positioning the hearing aid device in the ear canal, wherein the acoustic signal depends on the position of the hearing aid device.

11. The hearing aid device according to claim 3, wherein the hearing aid device comprises a sound guide unit configured to generate an acoustic signal to the hearing aid user during positioning the hearing aid device in the ear canal, wherein the acoustic signal depends on the position of the hearing aid device.

12. The hearing aid device according to claim 4, wherein the hearing aid device comprises a sound guide unit configured to generate an acoustic signal to the hearing aid user during positioning the hearing aid device in the ear canal, wherein the acoustic signal depends on the position of the hearing aid device.

13. The hearing aid device according to claim 6, wherein the sound guide device is configured to stop generating an acoustic signal when a predefined position is achieved, preferably a position defined or measured relative to the eardrum.

14. A hearing aid positioning system comprising:
a hearing aid configured to be partly or fully inserted into the ear canal of a user; and
a tool configured for engaging with a first end of the hearing aid,
wherein the hearing aid comprises:
a receiver adapted to generate and send an acoustic signal towards the eardrum of a hearing aid user,
a microphone configured to receive acoustic signals,
a processing unit configured to determine if the hearing aid is positioned in a correct position in the ear canal on the basis of acoustic signals received by the microphone as reflected signals from the eardrum, and
an elongated connection member in said first end, said elongated connection member being configured with a connection surface comprising a magnetic or magnetizable member,
wherein said tool comprises:
a holding structure configured to be gripped by a user,
a connection structure extending from said holding structure, and provided with a magnetic or magnetizable member configured to engage with said magnetic or magnetizable member of said hearing aid, and
a mechanical engagement structure, wherein said mechanical engagement structure is configured to connect with at least a part of the elongated connection member of said hearing aid, wherein said tool is configured to be handled by a user for guiding the hearing aid into the ear of a user.

15. The hearing aid positioning system according to claim 14, wherein the tool or the hearing aid comprises an electromagnet configured to generate a magnetic field capable of attracting or repelling an opposite magnetic or magnetizable member, wherein the tool comprises an activation unit configured to directly or indirectly activate the electromagnet and thereby make it attract or repel an opposite magnetic or magnetizable member.

16. The hearing aid positioning system according to claim 14, wherein said mechanical engagement structure of said tool is configured as two or more radially extending arms provided in a distal end of the connection structure of the tool and wherein the elongated connection member of the hearing aid comprises an engaging structure, configured to engage with the magnetic or magnetizable member of the connection structure of the tool simultaneously with said arms of the tool while the tool is in an engagement position relative to said elongated connection member of said hearing aid.

17. The hearing aid positioning system according to claim 16, wherein said two or more radially extending arms of said tool are configured to engage with two or more non-magnetic wire members of said hearing aid, wherein an angled slide of the engaging structure of the hearing aid is configured to guide the two or more arms of the tool in an engaging position within the wire members.

18. The hearing aid device according to claim 1, wherein the mechanical engagement structure of the tool is configured as two or more radially extending arms provided in a distal end of the connector structure of the tool, and
said engagement structure of said hearing aid device is configured to engage with the magnetic or magnetizable member of the connection structure of the tool simultaneously with the arms of the tool while the tool is in an engagement position relative to said elongated connection member of said hearing aid device.

19. The hearing aid device according to claim 18, wherein said engagement structure of said hearing aid device includes a plurality of non-magnetic wire members that engage with the arms of the tool while the tool is in an engagement position relative to said elongated connection member of said hearing aid device.

20. The hearing aid device according to claim 19, wherein the engaging structure of the hearing aid device further includes an angled slide configured to guide the two or more arms of the tool in an engaging position within the non-magnetic wire members.

* * * * *